United States Patent [19]

Schaub et al.

[11] Patent Number: 5,702,504

[45] Date of Patent: Dec. 30, 1997

[54] VACUUM PRESSURE SWING ADSORPTION PROCESS

[75] Inventors: Herbert Raymond Schaub, East Amherst; James Smolarek, Boston, both of N.Y.

[73] Assignee: Praxair Technology, Inc., Danbury, Conn.

[21] Appl. No.: 611,942

[22] Filed: Mar. 7, 1996

[51] Int. Cl.[6] ................................................ B01D 53/047
[52] U.S. Cl. .......................... 95/101; 95/102; 95/103; 95/105; 95/118; 95/130
[58] Field of Search .................. 95/95, 98, 100–105, 95/118, 122, 130; 96/121, 133, 144

[56] References Cited

U.S. PATENT DOCUMENTS

| | | | |
|---|---|---|---|
| 2,944,627 | 7/1960 | Skarstrom | 183/4.7 |
| 3,142,547 | 7/1964 | Marsh et al. | 95/100 |
| 3,430,418 | 3/1969 | Wagner | 55/25 |
| 3,636,679 | 1/1972 | Batta | 55/26 |
| 3,680,288 | 8/1972 | Eluard | 55/58 |
| 3,738,087 | 6/1973 | McCombs | 55/58 |
| 3,788,036 | 1/1974 | Lee et al. | 55/25 |
| 4,144,037 | 3/1979 | Armond et al. | 55/58 |
| 4,194,891 | 3/1980 | Earls et al. | 95/98 |
| 4,194,892 | 3/1980 | Jones et al. | 95/95 |
| 4,340,398 | 7/1982 | Doshi et al. | 55/25 |
| 4,512,779 | 4/1985 | Hay | 55/26 |
| 4,650,501 | 3/1987 | Hiscock et al. | 55/26 |
| 4,781,735 | 11/1988 | Tagawa et al. | 55/26 |
| 5,122,164 | 6/1992 | Hirooka et al. | 55/26 |
| 5,223,004 | 6/1993 | Eteve et al. | 55/26 |
| 5,296,017 | 3/1994 | Kono et al. | 95/14 |
| 5,328,503 | 7/1994 | Kumar et al. | 95/101 |
| 5,330,561 | 7/1994 | Kumar et al. | 95/101 |
| 5,354,346 | 10/1994 | Kumar | 95/101 |
| 5,370,728 | 12/1994 | LaSala et al. | 95/101 |
| 5,415,683 | 5/1995 | Leavitt | 95/101 |
| 5,429,666 | 7/1995 | Agrawal et al. | 95/101 |
| 5,518,526 | 5/1996 | Baksh et al. | 95/100 |
| 5,520,720 | 5/1996 | Lemcoff | 95/101 X |

OTHER PUBLICATIONS

Liow et al., "The Backfill Cycle of the Pressure Swing Adsorption Process", AICh.E. Journal, Jan., 1990, vol. 36, No. 1, pp. 53–65.

Suh et al., "Combined Cocurrent–Countercurrent Blowdown Cycle in Pressure Swing Adsorption", AICh.E. Journal, Mar., 1989, vol. 35, No. 3, pp. 523–526.

Primary Examiner—Robert Spitzer
Attorney, Agent, or Firm—Robert J. Follett

[57] ABSTRACT

Vacuum pressure swing adsorption (VPSA) processing is carried out employing a processing sequence of ten steps that serves to enhance the productive capacity thereof for air separation and other desirable applications.

12 Claims, 9 Drawing Sheets

Overlap Equalization - Product Pressurization with Purge Cycle

Step #1  Raising pressure feed with overlap product pressurization

Step #2  Raising pressure feed

Step #3  Constant pressure feed and make product

Step #4  Falling pressure equalization

Step #5  Falling pressure evacuation with overlap equalization

Step #6  Falling pressure evacuation

Step #7  Falling pressure evacuation

Step #8  Oxygen purge

Step #9  Raising pressure evacuation with overlap equalization

Step #10  Raising pressure feed with overlap equalization

VACUUM PRESSURE SWING ADSORPTION PROCESS

BACKGROUND OF THE INVENTION

1. Field of the Invention

The invention relates to pressure swing adsorption operations. More particularly, it relates to an improved vacuum pressure swing adsorption process.

2. Description of the Prior Art

Pressure swing adsorption (PSA) processes and systems are well known in the art for achieving desirable separation of the components of a feed gas mixture. In the practice of the PSA process, a feed gas mixture containing a more readily adsorbable component and a less readily adsorbable component is passed to an adsorbent bed containing adsorbent material capable of selectively adsorbing the more readily adsorbable component at an upper adsorption pressure. The bed is thereafter depressurized to a lower desorption pressure for desorption of the more readily adsorbable component and its removal from the bed prior to the introduction of additional quantities of the feed gas mixture thereto as cyclic adsorption-desorption-repressurization operations are contained in a PSA system containing one or more adsorbent beds. In conventional PSA practice, multi-bed systems are commonly employed, with each bed in the system employing the PSA processing sequence, on a cyclic basis, interrelated to the carrying out of said sequence in the other beds of the system.

In highly advantageous variations of the PSA process, each adsorbent bed, during the desorption portion of the overall PSA cycle, is depressurized to a lower desorption pressure in the subatmospheric, i.e. vacuum, range. Such a process is referred to as a vacuum pressure swing adsorption (VPSA) process.

Despite advances in the PSA/VPSA art, there is a need in the art for further improvements to provide a more efficient pressure swing adsorption processes for the production of a concentrated gas, such as oxygen, from a gas mixture, such as air, which processes utilize the adsorbent in a more efficient manner (lower bed size factor), and requires less energy than other processes using prior art technology to produce high purity gas from gas mixtures.

As indicated above, the PSA process is based upon the differential adsorption of selectively adsorbable gases and non-preferentially adsorbable gases, from mixtures thereof, on conventional adsorption bed materials such as zeolites. In the known process, the adsorption bed unit, or the first such bed unit of a two or three bed unit system, each of which may contain a lower bed stratum for removing water and carbon dioxide and an upper or downstream bed stratum for adsorbing the selectively adsorbable gas from supply of a gas mixture passed therethrough, is pressurized to a high pressure value to cause the selective removal of water and carbon dioxide and the selective adsorption of the one gas, while the pressurized non-selectively adsorbable gas is unaffected and passes through to a reception unit, which may be the second bed unit of the system. In such case the second bed unit becomes pressurized by the non-adsorbed gas, preparatory to coming on stream in the next cycle. The next bed unit, i.e. a third bed unit or the first bed unit of a two bed system, is being cleaned by back-flow or countercurrent evacuation by passing a supply of medium pressure waste gas or void gas purged from an equalization tank or from the bed unit being depressurized after producing the non-adsorbed, concentrated gas. This cleans the bed unit for subsequent repressurization and concentrated gas production. After a timed period the second bed unit is brought into sequential use, the first bed unit is evacuated and the second bed unit is repressurized.

Although many modifications and variations of the basic PSA and VPSA processing cycle have been studied and applied to commercial processes, such as for the production of oxygen from air, such systems generally are less efficient and more capital intensive for high purity production of oxygen, especially for large plants, when compared to the alternative method using cryogenic distillation. Therefore, it is an object of this invention to provide a highly efficient PSA process for producing large volumes of high purity oxygen from air with a lower power requirement.

The original PSA process was developed by Skarstrom, U.S. Pat. No. 2,944,627, and consists of a cycle including four basic steps: (1) Adsorption, (2) Depressurization, (3) Purge, and (4) Repressurization. Several variations of the Skarstrom cycle have evolved. One such system is described in Wagner U.S. Pat. No. 3,430,418, wherein at least four beds are required to produce product continuously. The extra cost and complexity of providing four beds rather than a lesser number generally makes the Wagner system economically unfeasible.

In U.S. Pat. No. 3,636,679, Batta described a system where compressed air and product oxygen (obtained from another bed going through the equalization falling step) are simultaneously introduced at opposite ends of the same adsorbent bed. Another process for achieving further savings in equipment cost by using a two bed system is described by McCombs in U.S. Pat. No. 3,738,087, wherein an increasing pressure adsorption step is employed with feed air introduced to a partially repressurized adsorbent bed. Following the work of McCombs, Eteve et al., U.S. Pat. No. 5,223,004 described a PSA process utilizing the following steps: (1) a countercurrent product pressurization starting from the low pressure level of the cycle to an intermediate pressure level, (2) a cocurrent feed pressurization from the intermediate pressure level up to the adsorption pressure without bleeding off, (3) a production step wherein air is admitted and oxygen is bled off cocurrently, (4) a step where oxygen is bled off by partial depressurization cocurrently, wherein the admission of air is discontinued, and (5) a desorption step by depressurization countercurrently down to the low pressure level of the cycle.

Many more variations of the original PSA cycle can be found in the literature. For example, U.S. Pat. Nos. 4,194,891, 4,194,892 and 5,122,164 describe PSA cycles using short cycle times, wherein smaller particle size adsorbents are used to reduce diffusive resistance; Doshi et al, U.S. Pat. No. 4,340,398, discloses a PSA process utilizing three or more beds, wherein void gas is transferred to a tank prior to bed regeneration, and later used for repressurization. In addition, a process modification to a two-bed PSA process incorporating tank equalization is disclosed in U.S. Pat. Nos. 3,788,036 and 3,142,547, where the conserved gas is used as the purge gas for another bed.

More recently, Tagawa et al., U.S. Pat. No. 4,781,735, discloses a PSA process using three adsorbent beds to produce oxygen, with enhanced oxygen recovery achieved by connecting the feed end of one bed to the feed end of another bed (bottom-bottom equalization), and for all or part of the equalization time, top-top bed equalization is carried out simultaneously with the bottom-bottom equalization. In addition, U.S. Pat. No. 5,328,503, Kumar et al, describes a PSA process that uses an initial depressurization step to provide a purge gas, followed by an optional bed-bed pressured equalization step. In accordance with this patent, at least two adsorbent beds are employed, and a combination of product and feed gas are used for repressurization of the adsorbent beds.

Suh and Wankat (AIChE J. vol. 35, p523, 1989) disclose the use of combined cocurrent-countercurrent depressurization steps in PSA processes. They disclose that for the production of oxygen from air, the addition of a cocurrent depressurization step is not helpful. Liow and Kenny (AIChE J. vol. 36, p53, 1990) disclose a "backfill cycle" for oxygen production from air via computer simulation. They disclose that a countercurrent (with respect to feed direction) product repressurization step is beneficial when included in the cycle for producing an enriched oxygen product.

In the Baksh et al U.S. patent application Ser. No. 08/319,692, now U.S. Pat. No. 5,518,526, an improved PSA process is disclosed for separating a first gas, such as oxygen gas, from gas mixtures containing said first gas and one or more other gases including gases which are more preferentially adsorbable. It involves novel steps of simultaneous equalization and evacuation followed by simultaneous feed and product gas repressurization of PSA beds. This results in an overall faster and more efficient cycle with 100% utilization of a vacuum or pressure reducing blower, and a reduction in power use of about 15%.

The heart of the Baksh et al. process involves overlapping of various steps of the PSA cycle to reduce total cycle time and thus improve productivity. The other important parameters include choice of operating conditions (high pressure, low pressure, pressure at the end of equalization falling step, and the amount of high purity product used in the product pressurization step), the times allocated for each step, the order in which each step of the cycle is executed, and the use of equalization falling gas to provide the gas required for refluxing and equalization rising. The unique step in the cycle is the step of simultaneously evacuating the bed undergoing the equalization rising step while the other bed is undergoing the equalization falling step. The time allocated for this step must be chosen, so that at the end of this step, the former bed has been purged and also partially pressurized. The next step in the cycle is simultaneous product and feed pressurization at opposite ends of said bed, followed by feed pressurization to the desired adsorption pressure. Other key features of the invention are as follows: (a) the product gas required in the step of simultaneous feed and product pressurization usually comes from the product tank, or from another bed in the production step; and (b) the cocurrent depressurization or pressure equalization falling gas either goes to the downstream end of another bed or to a second storage tank. In the latter case, no bed-bed communication is required, which adds further flexibility in controlling the PSA process.

Despite such desirable advances in the art, PSA/VPSA processes remain less efficient and more capital intensive, especially for high purity oxygen production in large plants, than desired, particularly as compared to the alternative of cryogenic distillation. There is a desire in the art, therefore, for further improvements to facilitate the use of the highly desirable PSA/VPSA technology in large scale commercial plants. It is particularly desirable to achieve improvements enabling the adsorbent to be utilized in a more efficient manner, i.e. to achieve a lower bed size factor. An improved PSA/VPSA process would desirably achieve increased capacity, as compared to prior art processes, for the production of high purity oxygen from feed air.

It is an object of the invention, therefore, to provide a VPSA process having enhanced efficiency for the production of the less selectively adsorbed component, e.g. oxygen from a feed gas, e.g. air.

It is another object of the invention to provide a process for increasing the oxygen production from a VPSA-air feed system.

With these and other objects in mind, the invention is hereinafter described in detail, the novel features thereof being particularly pointed out in the appended claims.

SUMMARY OF THE INVENTION

The invention employs a VPSA adsorption-desorption-repressurization processing sequence including an oxygen purge step at lower desorption pressure, an overlap feed and pressure equalization step, and a constant pressure adsorption-product oxygen make step, resulting in a desirable increase in the capacity of a VPSA system.

DETAILED DESCRIPTION OF THE INVENTION

The process of Baksh et al. incorporates a novel sequence of operating steps in the PSA cycle, wherein the unload times for rotary machines (e.g. compressors and vacuum pumps) are minimized, product recovery is enhanced, the bed size factor (BSF) is comparable or lower than with prior art PSA cycles, and the power consumption is 5–20% lower than prior known PSA cycles. The operating steps in the present PSA cycle are as follows:

(I) Simultaneous introduction of feed gas mixture (e.g. air) and gas product being concentrated (e.g. oxygen) at opposite ends of the bed for partial repressurization to an intermediate pressure level. In this step, the product gas usually comes from the product tank, or from another bed in the production step.

(IIa) Feed pressurization (cocurrent) from the intermediate pressure level to the adsorption pressure, in the first part of step 2.

(IIb) Adsorption and gross product production, the second part of step 2.

(III) Cocurrent depressurization wherein the gas is transferred directly or indirectly, i.e., through an equalization tank to another bed that is being pressurized and evacuated simultaneously. In the indirect mode, the cocurrent depressurization gas goes to a second storage tank. In this case, no bed-bed communication is required.

(IV) Evacuation or depressurization to waste (countercurrent), while the other bed is undergoing simultaneous feed and product pressurization for a two-bed PSA process.

Figure 1A:
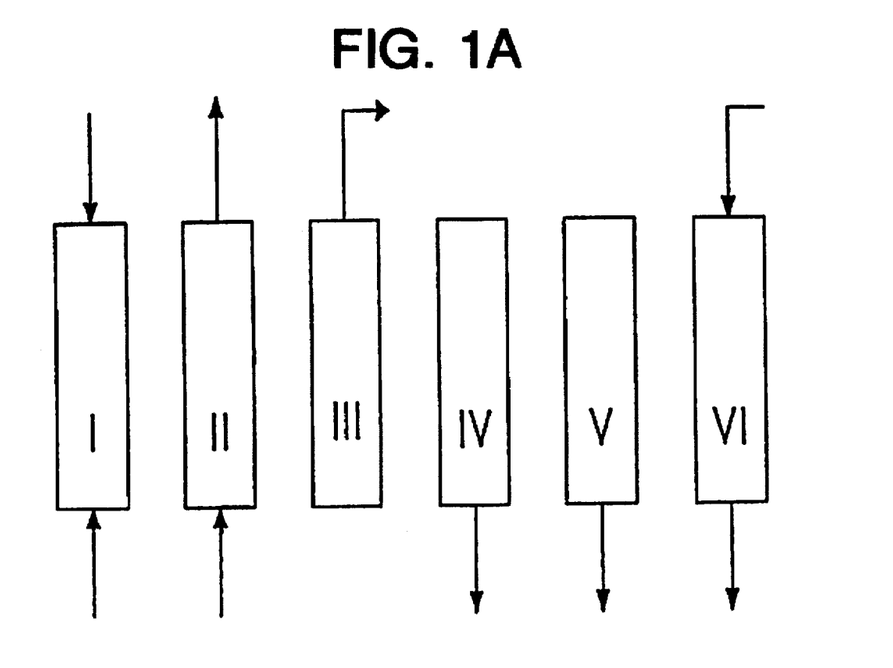
FIG. 1A illustrates the steps of a dual adsorption column cycle according to an embodiment of the present invention in bed A of the two-bed system.
Figure 1B:
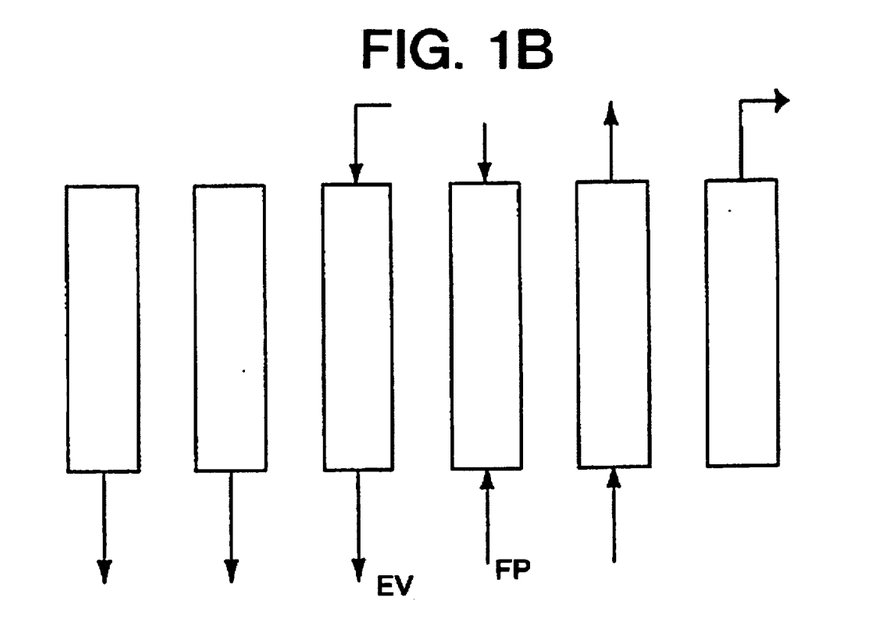
FIG. 1B illustrates said steps in bed B thereof.

(V) Further evacuation or depressurization to waste. This step is the same as the previous step for the first bed. However, the other bed step is undergoing adsorption and gross product production (see FIG. 1).

(VI) Simultaneous pressurization countercurrent) and evacuation, wherein the reflux gas is supplied by another bed undergoing cocurrent depressurization (step 3) or from the second storage tank that was used to capture cocurrent depressurization gas.

The above steps are shown schematically in FIGS. 1A and 1B of the drawings for a two-bed PSA process. Five points should be noted about this cycle: (a) a bed-bed equalization step is superimposed onto the purge step, wherein the bed undergoing equalization rising is also being evacuated simultaneously, (b) all of the reflux gas needed to purge the bed during regeneration is supplied by the void gas obtained from another bed during the cocurrent depressurization (equalization falling) step, (c) an overlap of product and feed pressurization steps, followed by feed pressurization alone to the adsorption pressure is used to achieve higher product flow rate, (d) a decrease in the total cycle time due to the superposition of individual steps, results in lower bed size factor (BSF), and (e) there is no unload time for the vacuum pump (see FIG. 1), i.e., the vacuum pump is utilized 100%.

In the processing cycle of Baksh et al, the equalization falling gas provides all of the gas needed by another bed that is undergoing equalization rising and evacuation simultaneously. Thus, this step overlaps the equalization step with the purge step, thereby modifying the conventional purge step and equalization step used in prior art PSA cycles. In addition, all of the reflux gas necessary to push the nitrogen wavefront out of the bed is provided by the other bed going through the equalization falling step. In this mode of operation, lower purity gas is used for the combined purging and equalization rising steps. The next step in the cycle (product pressurization, countercurrently) uses high purity product gas, usually from the product tank, to pressurize the column at the product end, while feed gas is simultaneously fed at the other end of the bed. The overlapping of individual steps results in faster PSA cycles with a high production rate of oxygen (lower BSF). In addition, since this cycle does not use a conventional purge step, none of the product gas is consumed for purging of the adsorbent bed. Also, during simultaneous evacuation and equalization rising, the bed pressure at the end of the step must be higher than the pressure in the previous step (evacuation step). Thus, both the flowrate of the incoming gas and the time allocated for this step must be selected carefully, so that at the end of this step, the bed has been purged and partially pressurized.

Thus, the Baksh et al process consists of the overlapping of various steps in the PSA cycle to reduce total cycle time and thus improve productivity, the choice of operating conditions (high pressure, low pressure, pressure at the end of the equalization falling step, and the amount of high purity product used in step 1 of FIG. 1A), the times allocated for each step, the order in which each step of the cycle is executed, and the use of equalization falling gas to provide the gas required for refluxing and equalization rising. The unique step in the cycle is step III (see FIG. 1A), wherein the bed undergoing the equalization falling step is opened to another bed which is simultaneously being pressurized and evacuated. The time allocated for this step must be chosen so that at the end of this step, the second bed has been purged and partially pressurized. The next step in the cycle is simultaneous product and feed pressurization at opposite ends of the second bed, followed by feed pressurization to the adsorption pressure, step IIA, FIG. 3.

To practice the Baksh et al process for product $O_2$, for example, the following steps can be carried out:

(I) The intermediate pressure level, wherein both feed and product are introduced at opposite ends of the bed for partial pressurization, is selected between 0.5–1.2 atm. (1.0 atm.= 14.696 psi), and preferably about 0.9 atm., while the high pressure level is selected between 1.2–2.0 atm., and preferably about 1.42 atm. The low pressure level is selected between 0.30–0.45 atm., and preferably about 0.35 atm.

(II) The pressure during the production step can be rising from the intermediate pressure level of about 0.9 atm. (the pressure at the end of simultaneous product and feed step) to the adsorption pressure of about 1.42 atm. Alternatively, feed pressurization without bleed off occurs after simultaneous product and feed pressurization to reach the adsorption pressure, then a control valve opens to produce product. In this latter case, the pressure during the production step is at constant pressure.

(III) The feed input is terminated, and the column is depressurized cocurrently to recover the void gas and light component that co-adsorbed on the adsorbent. The pressure during this step decreases from the adsorption pressure of about 1.42 atm. down to about 1.10 atm. The gas collected in this step is henceforth referred to as "void gas". This gas can be stored in a second storage vessel (equalization tank) or can be fed directly to the product end of another bed undergoing equalization rising and evacuation steps simultaneously. In the latter case, at the end of this step, the bed has been purged and partially pressurized. Thus, the time allocated for this step is crucial, since some of the void gas is used as refluxing gas to move the nitrogen (heavy component) wavefront out of the bed via the feed end, while the remaining void gas is used for partial product pressurization. The pressure of the bed during this step rises from about 0.35 atm. to about 0.60 atm.

(IV) and (V) The desorption phase by depressurization countercurrently down to the low pressure level of about 0.35 atm.

(VI) First part of pressurization takes place while this bed is still undergoing evacuation. The gas required for this step is obtained from another bed undergoing the equalization falling step, or from a second tank that was used for storing void gas obtained from another bed during the equalization falling step. During this step, the pressure in the bed receiving void gas rises from about 0.35 atm. to about 0.60 atm.

Figure 2:
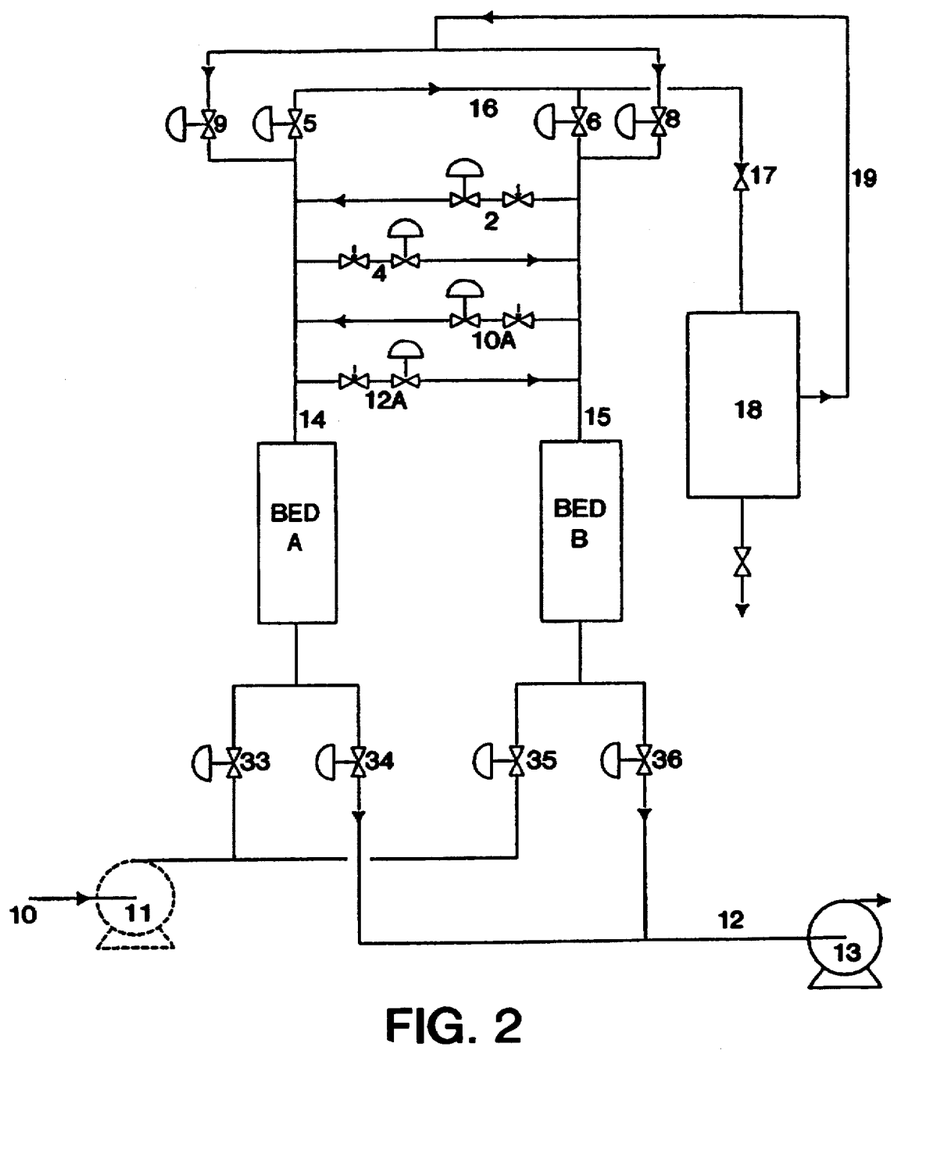
FIG. 2 is a flow sheet for the dual bed cycle of FIG. 1.
Figure 3:
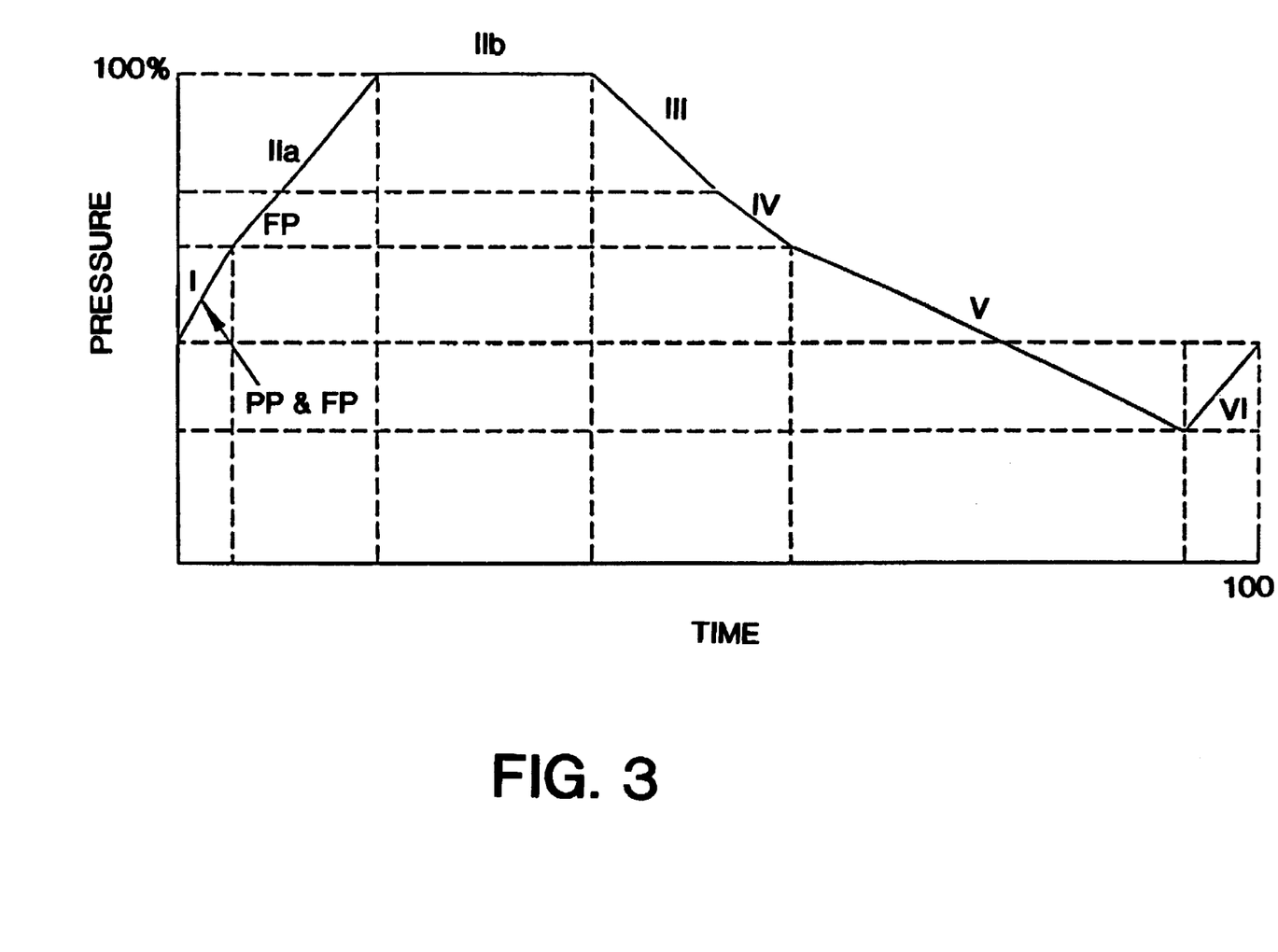
FIG. 3 is a time/pressure graph illustrating the evolution of pressure in a bed during the different steps of a complete cycle.

The basic features of the Baksh et al process can be illustrated by describing the operation of a two-bed PSA process shown in FIG. 1A and FIG. 1B of the drawings. However, it should be understood that one, or more than two beds, and other operating conditions (e.g. other pressure ranges) can be employed according to the Baksh et al process. FIG. 2 is a schematic diagram of a two-bed PSA process consisting of the two adsorption beds A and B of FIGS. 1A and 1B, feed compressor(s) or blower(s) 11, vacuum pump(s) 13, product storage tank 18 and interconnected lines and valves. FIG. 3 shows the evolution of pressure during the execution of the various steps of the cycle, with the cycle starting after step 6 in FIG. 1. Referring to FIGS. 1A, 1B, 2 and 3, the PSA process is disclosed for a complete cycle. The PSA process of FIG. 2 consists of two beds (A & B) filled with adsorbents, each having an inlet valve 33 or 35, and an outlet valve 34 or 36. The feed inlet valves 33 and 35 are connected to an air supply conduit 10 through a blower machine or compressor 11; whereas the exhaust outlet valves 34 and 36 are connected to a vacuum exhaust conduit 12 incorporating a vacuum pump 13. The bed outlet conduits 14 and 15 communicate with valves 5 and 6 to a production conduit 16 through a control valve 17 that connects to a product storage tank 18. Valves 10A and 12A allow the two beds to communicate if a purge gas step is included in the cycle. For example, valve 12A when opened, allows a portion of the product gas from bed A to supply a purge stream to bed B. Similarly, valve 10A when opened, allows a portion of the product gas from bed B to supply the purge gas to bed A. The outlet conduits 14 and 15 are connected to each other by valves 2 and 4. All the valves in the diagram are operated electronically via a computer system and program logic. Conduit 19 is connected to the product storage tank, and supplies product gas, via valves 8 and 9, for product pressurization of beds B and A, respectively.

Referring to FIGS. 1A, 1B and 2, the VPSA O$_2$ process for a two-bed system is now described to illustrate the opening and closing of the valves for each step of the cycle. All valves are closed except those indicated in each step. In this example the cycle time is about 60 seconds and the pressure ranges between a low of 0.35 atm. and a high of 2.0 atm.

Step I: Feed (air) through line 10, and product (oxygen), from tank 18, are introduced simultaneously at opposite ends of the bed. In the case of bed A, valves 33 and 9 are opened to allow feed and product gas to enter the bed, respectively. During this time, valve 36 is opened and the other bed B is undergoing evacuation.

Step II: In the feed pressurization and gross product make step, valves 33 and 5 are open and bed A undergoes further feed pressurization. Control valve 17 program logic dictates when this valve will be opened to allow product gas to enter the product tank 18 from bed A. For instance, if constant pressure is required during the make product steps, then control valve 17 only opens when bed A reaches a predetermined pressure level to allow product to enter the product tank 18. During the feed pressurization and make product step (step 2) for bed A, bed B is undergoing evacuation via valve 36.

Step III: Cocurrent depressurization. In one version of this invention, valve 33 is closed, and valve 4 is opened to recover the void gas from bed A and direct it to bed B to partially pressurize bed B (equalization rising for bed B), and as reflux gas to push the nitrogen wavefront in bed B towards the feed end thereof. During this time valve 36 is still opened, thus bed B undergoes equalization rising and evacuation simultaneously. Another version of this invention collects the equalization falling void gas into a separate storage tank for supply to bed B. In this latter case, no bed-bed communication is necessary.

Step IV: Valve 34 is now opened to evacuate bed A countercurrently, and valves 35 and 8 are opened so that bed B undergoes simultaneous feed and product pressurization from opposite ends.

Step V: Valve 34 is still opened with bed A undergoing further evacuation, while valves 35 and 6 are opened so that bed B is pressurized with feed to the adsorption pressure. Control valve 17 logic determines when product gas from bed B enters the product tank 18.

Step VI: Valve 35 is closed, and bed B undergoes depressurization via valve 2 that connects bed A or a second storage tank, which in turn provides the increasing pressure purge to bed A. During this time, valve 34 is still in the opened position, allowing bed A to undergo equalization rising and evacuation simultaneously.

Based on the cycle described above in relation to FIGS. 1A, 1B and 2, several modifications can be made to alter one or more of the steps without deviating from the application or the general functions of these steps. For example, the countercurrent depressurization step IV can be preceded by opening to air until the pressure in the bed drops to 1.0 atm., then evacuation begins.

Figure 8A:
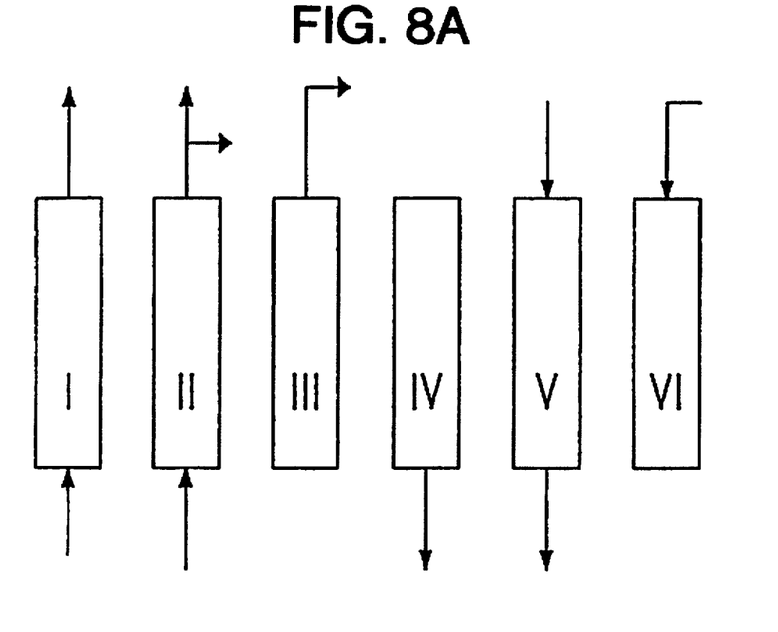
FIG. 8A illustrates the steps of a standard prior art adsorption column cycle in bed A of a two-bed system, for comparison purposes.
Figure 8B:
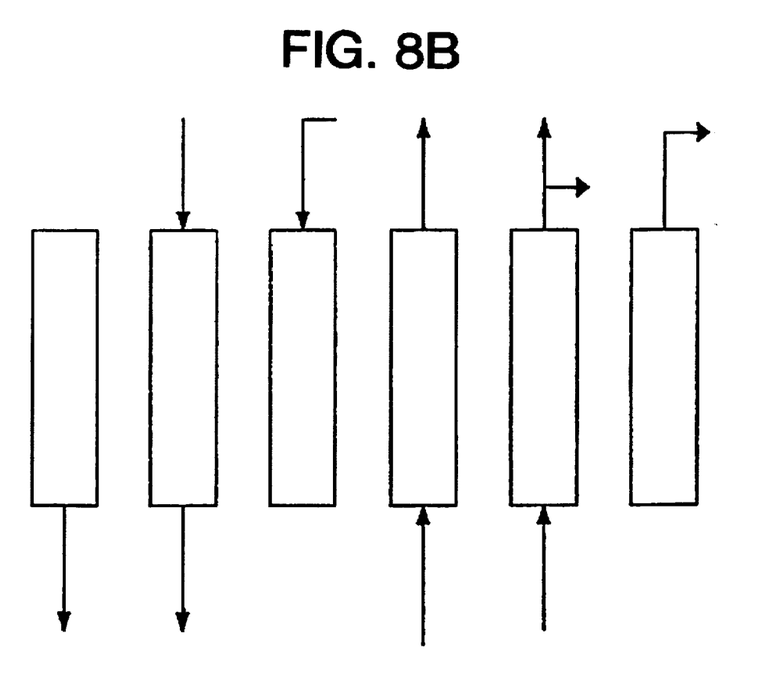
FIG. 8B illustrates said steps in bed B thereof.

The two-bed process of FIG. 2 utilizing the steps of FIGS. 1A and 1B can produce comparable oxygen purity and recovery with lower bed size and lower power consumption, as compared to the standard process depicted in FIGS. 8A and 8B. Also, in this process, the vacuum pump is used continuously by one or the other bed during each step of the cycle. Bed size reduction and power reduction achieved are in the range of about 5 to 20%.

Figure 4:
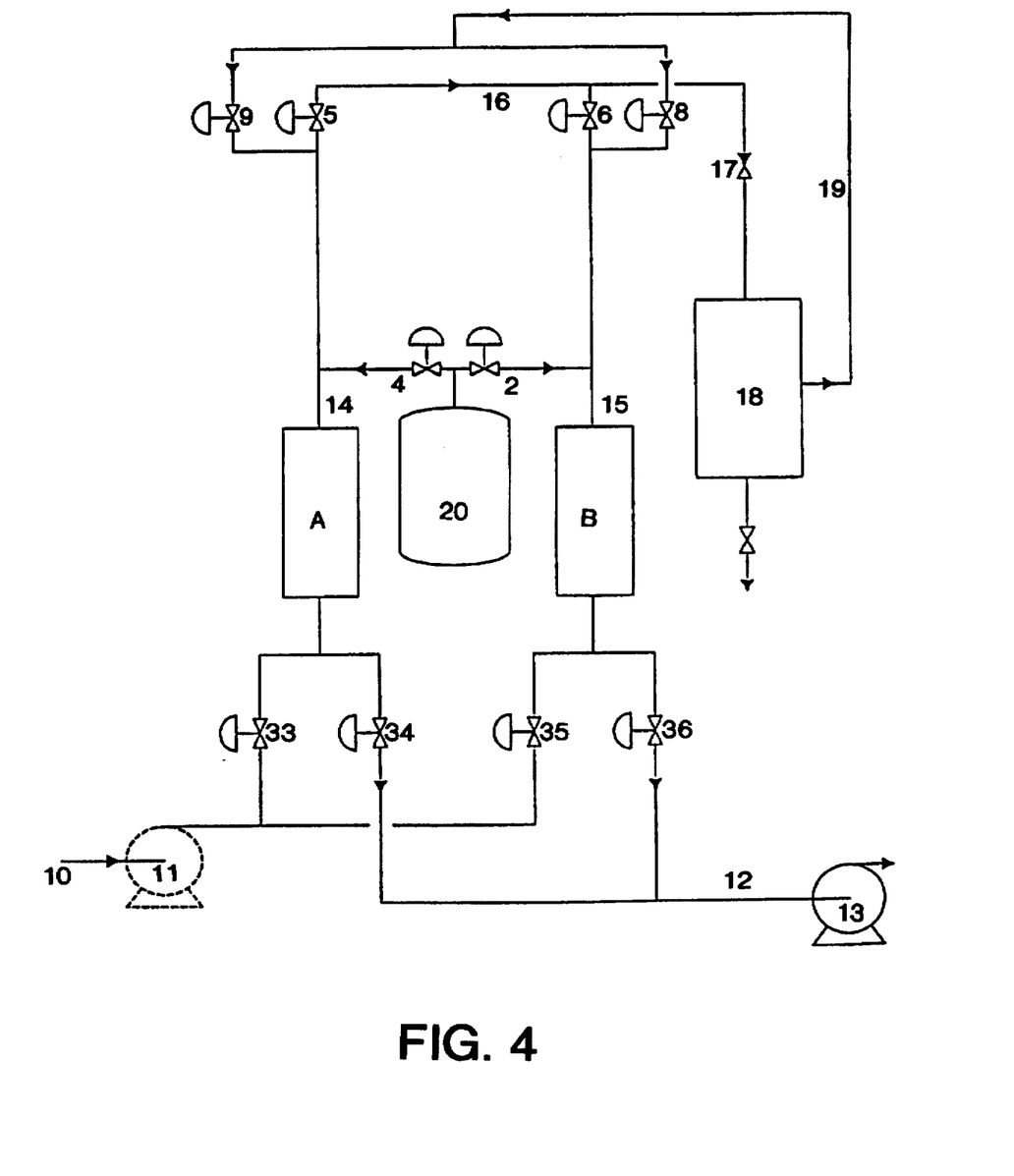
FIG. 4 is a flow sheet for a dual bed cycle having no bed-to-bed communication, according to another embodiment of the invention.
Figure 5A:
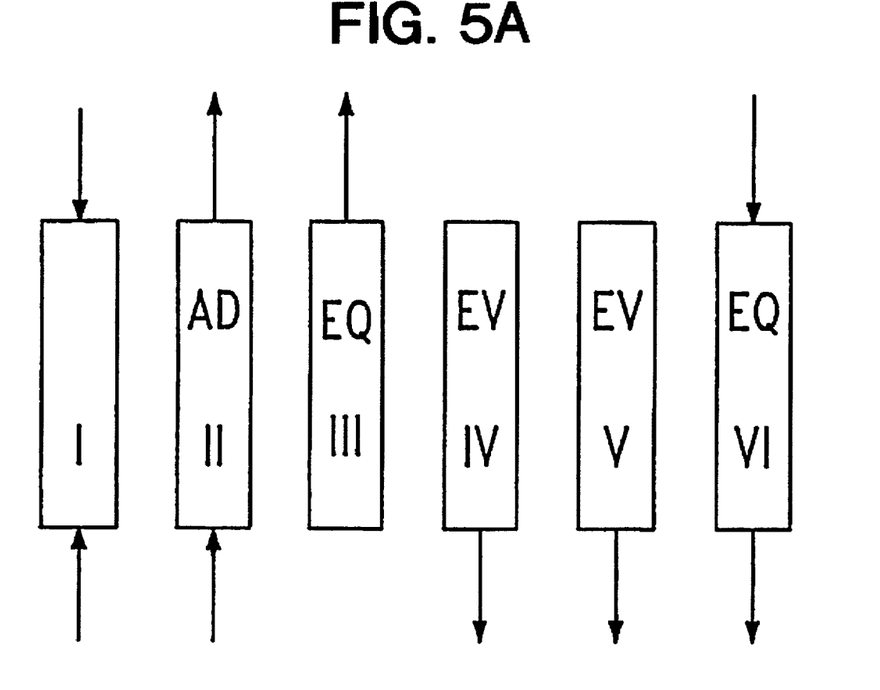
FIG. 5A illustrates the steps in the cycle of the system illustrated by FIG. 4 in bed A of a two-bed system.
Figure 5B:
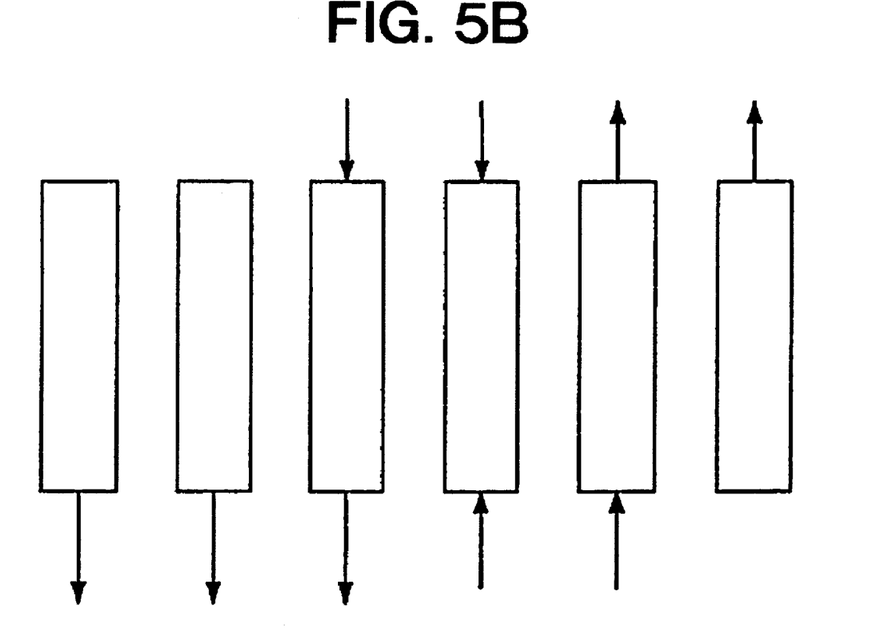
FIG. 5B illustrates said steps in bed B thereof.

FIGS. 4 and 5A and 5B show an alternate system for operating a two-bed PSA process that utilizes a product storage vessel 18 and an equalization tank 20. The execution of the various steps, including the opening and closing of the valves, is similar to the description given above for FIG. 2. However, the use of two storage vessels allows for greater flexibility in the process. For example, the individual steps in the cycle shown in FIGS. 5A and 5B do not have to occupy fixed periods of time. Thus, physical variables such as pressure and composition can be used easily to determine the time allocated for each step, thereby adjusting the process for changes in temperature, pressure and variable product demand. Since no bed-bed gas transfer is required, then it is possible to run each bed independently, and regard the process as a collection of single bed units. However, for proper sizing and sharing of compressor(s) and vacuum pump(s), some synchronization of the overall cycle of each bed with the cycles of the other beds is necessary.

While the apparatus employed in the Baksh et al process preferably makes use of cylindrical adsorbent beds with shallow dished heads on the top and bottom, and gas flow in the axial direction, other bed configurations can be used. For example, radial beds may be used to achieve a reduction in pressure losses with a concomitant reduction in power consumption. In addition, layered beds can be used with different adsorbents packed at various positions in the bed. For example, activated alumina can be placed at the feed end of the bed to remove water and carbon dioxide from the feed stream, and Li-X zeolite can be placed on top of the activated alumina to perform the separation of air into an oxygen enriched product.

The two bed system and process of FIGS. 4 and 5A and provide improvements comparable to those provided by the system and process of FIGS. 1A and 1B, 2 and 3 but with a slight improvement in the product recovery rate.

Figure 6:
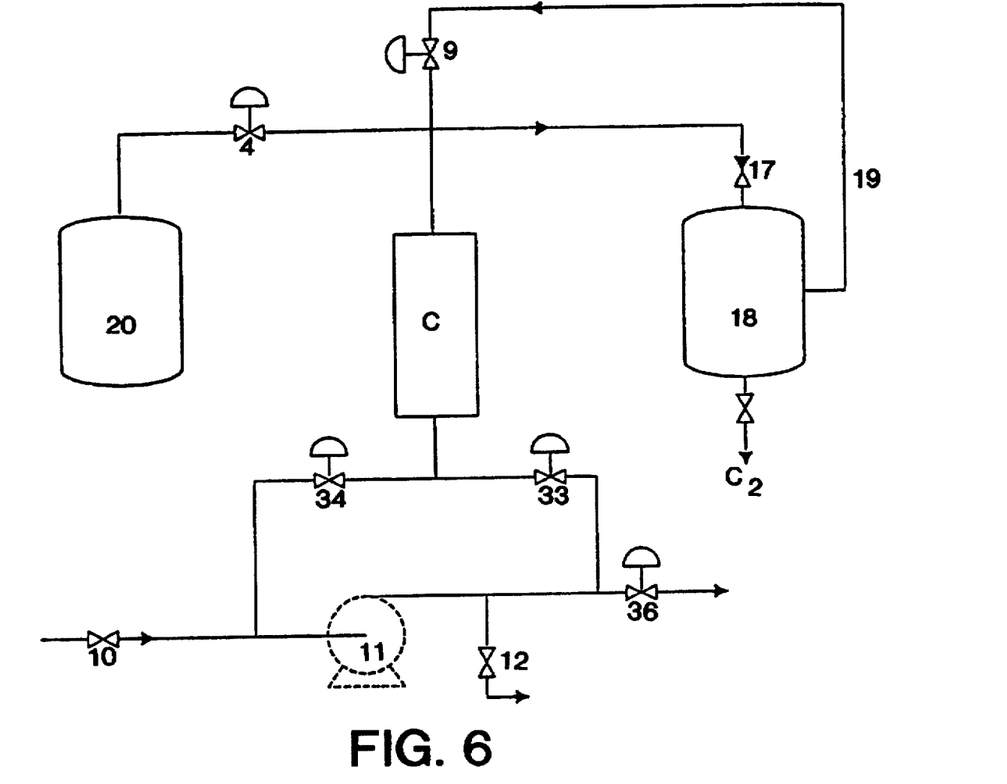
FIGS. 6 and 7 illustrate the flow sheet and column cycle for a single bed process according to another embodiment of the invention.
Figure 7:
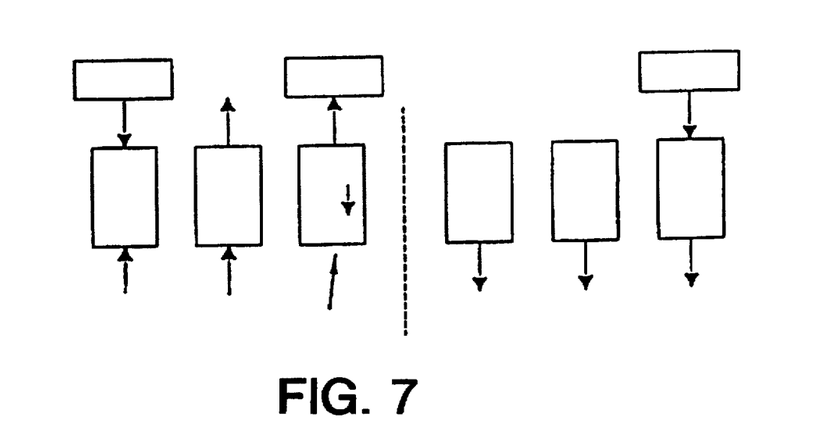

FIGS. 6 and 7 of the drawings illustrate the use of a single bed process utilizing a product tank 18 and an equalization tank 20. In order to have high machine utilization, the process of FIG. 6 shows a single compressor/blower 11 used to perform the pressurization and evacuation steps illustrated in FIG. 7. Referring to FIGS. 6 and 7, the steps in the cycle are briefly described.

Assuming that the cycle begins with simultaneous feed and product pressurization (see FIGS. 6 and 7), valves 9, 10 and 33 are opened and the other valves are closed. Conduit 19 is connected to the product storage tank, and supplies product gas, via valve 9, for product pressurization of bed C. Valve 17 is a differential pressure check valve pens only when the pressure in the adsorbent vessel C becomes greater than the pressure in the product tank 18. After some time, valve 9 closes, and step 2 begins. During step 2, feed pressurization continues via valves 10 and 33, differential check valve 17 opens and product gas enters the product storage tank 18. At the end of step 2, valve 33 is closed, and valve 36 is opened to unload the compressor 11. During this time, the bed undergoes cocurrent depressurization with valve 4 in the opened position to collect the void gas into the equalization tank 20. Note that the check valve 17 will be in the closed position during the cocurrent depressurization step (step III), since the pressure of the adsorbent bed C will fall below that of the product tank (18). During step III execution, valves 9, 10 and 33 are in the closed positions. Upon the termination of step III, valves 12 and 34 are in the opened positions, while valves 4, 9, 10, 17, 33 and 36 are closed. During this step (step IV), gas in the adsorbent vessel C leaves via valve 34 and enters through the inlet of the compressor.

The next step (step V), illustrated in FIG. 7, is just a continuation of step IV (evacuation step). The final step (step VI) is executed with valves 12 and 34 still in the open positions. During this step, valve 4 is opened, and the gas from the equalization tank 20 provides the reflux gas to desorb the adsorbed gas and to partially pressurize the bed C.

Although only one example of a single bed process is described, other modifications of the single bed process can be easily obtained without deviating from the basic features of the invention.

FIG. 8A and FIG. 8B illustrate a conventional PSA process using a prior art cycle with cycle time about 10 to 20% greater than that of the present invention. In this figure, the symbols have the following meaning: AD=Adsorption and gross product production, PG=purge, EQ=Equalization, and EV=Evacuation.

It should be noted that the conventional cycle of the prior art consumes more power than the cycle of this invention. The Baksh et al process (FIG. 1A and FIG. 1B) provides a significant reduction in power consumption (more than 15%) over the prior art cycle (FIGS. 8A and 8B) using the same adsorbent. An advantage of the cycle of the Baksh et al process (FIG. 1A and FIG. 1B) over the standard equalization cycle (FIG. 8A and FIG. 8B) is that it permits 100% utilization of the vacuum pump.

Although the Baksh et al process cycle has been described in relation to VPSA $O_2$ processes, wherein particular embodiments of said process have been shown, other embodiments are contemplated along with modification of the disclosed features, as being within the scope of the claims. For example, the cycle thereof is not restricted to transatmospheric vacuum pressure swing adsorption (VPSA) cycles, and super atmospheric or subatmospheric pressure swing adsorption cycles may also be used. Thus the terms "pressurized", "high pressure", "medium pressure", "depressurization", etc., are used herein and in the claims as relative terms to include negative as well as positive pressures. Thus, gas under a small vacuum pressure is "pressurized" or at a "high pressure" relative to gas under a higher vacuum or negative pressure. Also, the novel cycle can be used in other mixture separations, e.g., $N_2/CH_4$ separation from landfill gas, and other gas mixtures for example feeds containing hydrogen as the nonpreferentially adsorbed product component and various impurities as selectively adsorbable components. These include light hydrocarbons, CO, $CO_2$, $NH_3$, $H_2S$, argon and water. Hydrogen-rich feed gas containing at least one of these adsorbable components include: catalytic reformer off-gas, methanol synthesis loop purge, dissociated ammonia and demethanizer over-head gas, steam-reformed hydrocarbons, ammonia synthesis loop purge gas, electrolytic hydrogen and mercury cell hydrogen. The Baksh et al process is also useful for separating any or all of the aforementioned adsorbables from gas mixtures in which nitrogen or helium is the primary constituent.

It will be apparent to those skilled in the art that the Baksh et al process provides a desirable vacuum pressure swing adsorption process for producing a concentrated gas from gas mixtures, involving the steps of simultaneous equalization and evacuation of the adsorption bed in one step, followed by simultaneous product and feed repressurization of the adsorption bed in another step, resulting in an overall faster and more efficient process in which the vacuum blower is utilized full time and power consumption is reduced by about 15%. The process of the Baksh et al invention can be conducted at pressure levels which are superatmospheric, transatmospheric or subatmospheric, and applies to the separation of gases in general, using PSA process systems.

In the further improvement described and claimed herein, the following additional steps are incorporated in the processing sequence as shown in FIG. 1A and FIG. 1B with respect to the Baksh et al process: (1) use of a purge step; (2) use of overlap feed and pressure equalization steps; and (3) use of a constant pressure product make step. The subject invention further optimizes load time for the feed compressors, and increases the average suction pressure for the vacuum pump used to achieve subatmospheric desorption pressure. The production of the VPSA facility is increased at an equivalent power consumption as shown by the Table below.

(1) Use of Purge Step—The introduction of a product purge gas to the processing sequence of Baksh et al is based on the desire to increase plant capacity without adding to the capital cost of the gas separation VPSA facility. The product purge step allows for operation of the VPSA cycle at a high subatmospheric desorption pressure than otherwise possible, while maintaining bed size requirements and maximizing oxygen recovery. For this purpose, oxygen purge gas is introduced into the top or product end of the adsorbent bed, while evacuation or regeneration for removal of the more selectively adsorbed nitrogen component of feed air continues at a constant lower desorption pressure. The oxygen purge rate is controlled to maintain constant or slightly rising lower desorption pressure, i.e. the pressure of the bed remains essentially at said lower, subatmospheric desorption pressure.

The incorporation of such a purge step makes it possible to lengthen the cycle time of the process without producing deep vacuum pressure levels. This additional cycle time results in a higher, more optimum upper adsorption pressure without increasing the feed air flow rate, which would increase mass transfer resistance effects and increase the adsorbent bed pressure drop. This latter effect would result in an undesirable lowering of the performance of the VPSA system.

The purge step also contributes to an elevation in the average suction pressure to the vacuum pump, by increasing the lower desorption pressure. This feature increases the waste capacity of the vacuum system without increasing capital investment, or increasing the vacuum flow rate and associated adsorbed bed pressure drop.

The use of purge gas also reduces the product pressurization requirement. By adding oxygen as purge gas supplied from the bed producing oxygen product directly, the product pressurization flow can be reduced by an equivalent amount. This enables a reduction in oxygen surge tank requirements to be realized, with a resultant rise in oxygen product delivery pressure. This reduction in the oxygen surge tank size results in a lower capital investment for the overall process.

This reduced requirement for product pressurization gas, which tolerates a higher pressure at the start of the product pressurization step, allows for extension of the pressure equalization steps to essentially full equalization of adsorbent beds. Such complete pressure equalization results in increased oxygen recovery.

(2) Use of Overlap Pressure Equalization—The improved processing cycle of the subject invention also incorporates the use of a pressure equalization step overlap in the feed step. This entails cutting the equalization step of the Baksh et al process short and initiating reloading of the feed when the pressure equalization step is completed. This feature increases the load time fraction of the feed compressor while allowing for complete equalization of the adsorbent beds, with an associated increase in product recovery. This improvement, as with the introduction of purge gas as discussed above, allows for the introduction of more feed air into the adsorbent bed, per processing cycle, without increasing the feed air flow rate (superficial gas flow rate in the adsorbent bed during the feed air step). This feature of the invention likewise results in lower mass transfer resistance and bed pressure drop for a given air loading rate, while obtaining the benefit of increased utilization of the adsorbent, and of the feed air compressor and feed air piping system.

The incorporation of the overlap equalization step also affects the operation of the vacuum pump. Thus, the vacuum pump suction is switched to the pressure equalization falling adsorbent bed during the overlap step. This results in the vacuum pump evacuating an adsorbent bed with a much higher pressure during this step. Such elevated suction pressure results in increased waste flow during this step, further contributing to the increase in average suction pressure associated with the processing cycle of the invention. This results in an increase in the waste removal capacity of the system, without the addition of more vacuum equipment and associated adsorbent bed pressure drop.

(3) Use of constant pressure product make step—The processing cycle of the invention is also operated with a constant pressure product delivery step, which entails a continuation of a rising pressure feed step up to the maximum top, i.e. upper adsorption, pressure before product oxygen is produced. Once the maximum top pressure is reached, the product delivery step is begun, and controlled constant at that pressure by regulating the product flow rate. This is shown to maximize production from the adsorption system by increasing the oxygen recovery therefrom. This increase in recovery is obtained as a result of a rise in the average feed pressure of the adsorption system. The effect thereof is an increase in productive capacity of 2–3%, with a corresponding reduction in bed size and compressor requirements, at only a slight increase in unit power consumption.

The invention enables an increase in equipment utilization for the entire facility, including adsorbent bed, feed and vacuum equipment. The increased utilization of feed air equipment comes directly from the increase in the load fraction time associated with the overlap/equalization step. The increased utilization of the vacuum equipment comes from the elevated average suction pressure of the waste gas pressure profile, resulting from a combination of the purge and overlap steps.

The adsorbent bed utilization is increased by processing more feed and waste gas due to the increased air load time fraction and elevated waste suction pressure, along with a shorter possible cycle time. Process efficiency is not sacrificed because this increase in gas flow quality has been made without increasing gas flow rates, and associated losses. The secondary improvement comes from the use of constant pressure product make, which further optimizes adsorbent bed utilization. This feature increases the oxygen recovery of the cycle by increasing the average pressure of the feed air.

Figure 9:
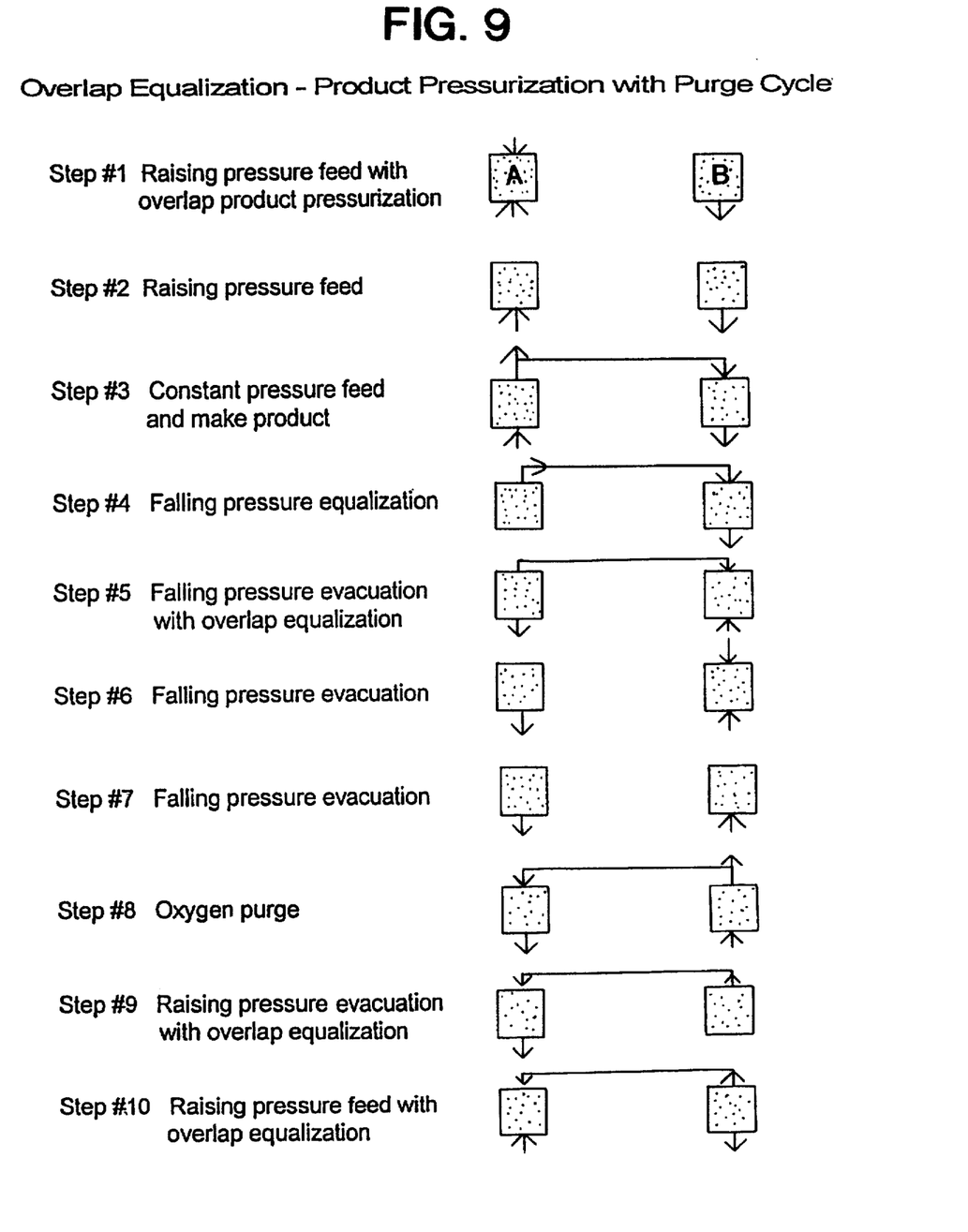
FIG. 9 is a processing cycle chart for the operation of a two bed VPSA system in accordance with the invention.
Figure 10A:
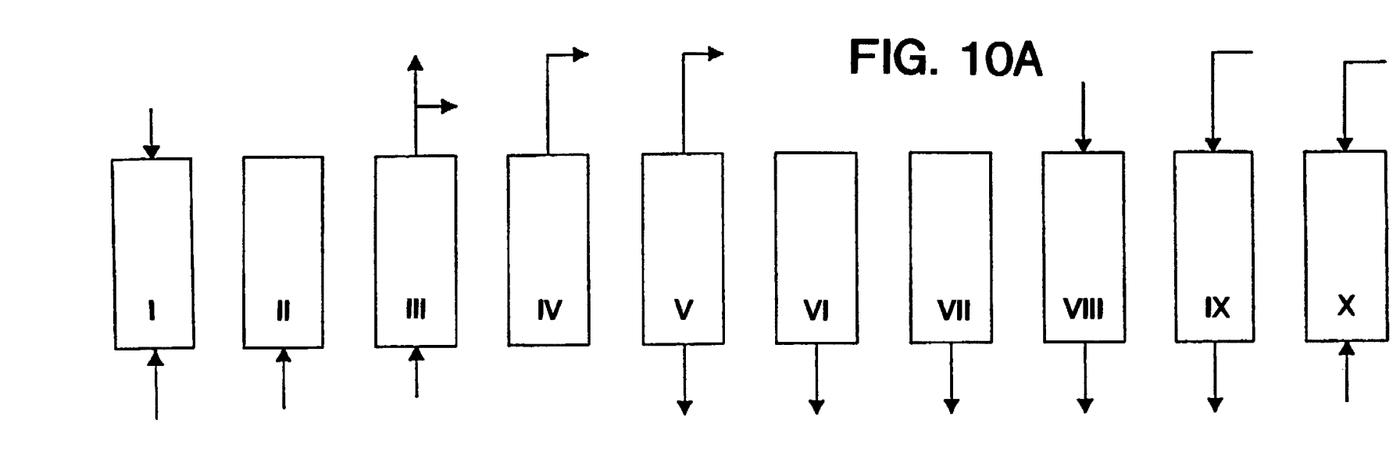
FIG. 10A is a process flow diagram illustrating the integration of the processing features of the invention in the process of Baksh et al as shown in FIG. 9 in bed A of a two-bed system.
Figure 10B:
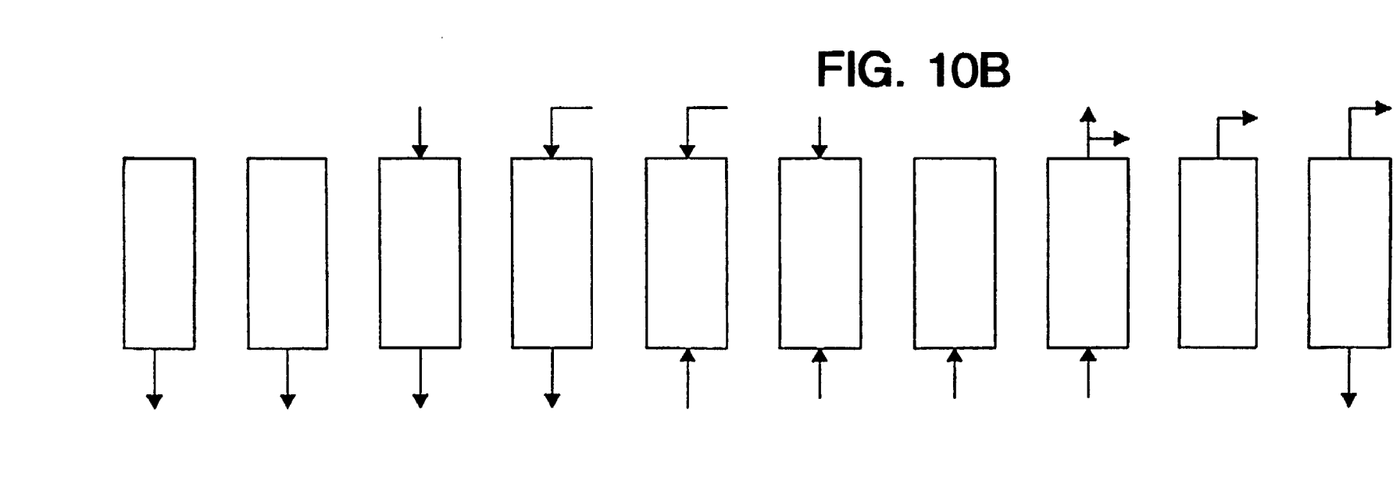
FIG. 10B illustrates said steps in bed B thereof.

The invention is hereinafter described with reference to the processing cycle chart of FIG. 9 and the companion process flow diagrams of FIG. 10A and FIG. 10B. In such illustrative embodiment, a two bed VPSA system is employed, with Bed A and Bed B each undergoing the indicated processing sequence on a cyclic basis, with one bed being depressurized for regeneration while the other bed is being pressurized and utilized for the selective adsorption of nitrogen from the additional quantities of air and the recovery of oxygen product. The following description of the ten recited steps of the process sequence in Bed A will be seen to pertain with respect to Bed B on an appropriate cyclic basis as described.

In step 1, and overlap feed adsorption/product pressurization step, simultaneous introduction of the feed gas, e.g. air, and gas product, e.g. oxygen, is employed from the feed and product ends of an adsorbent bed for partial repressurization to an intermediate pressure level. This step is also employed as step I in the process described in Baksh et al. In a particular illustrative embodiment summarized in the Table below, the adsorbent bed pressure is increased from 13 psia to 17 psia, with a step time of three seconds. The product pressurization gas is taken from a product, e.g. oxygen, surge tank.

In step 2, a rising pressure feed adsorption step feed gas, e.g. air, is added to the feed end of the adsorbent bed for cocurrent pressurization from the intermediate pressure level to the desired upper adsorption pressure. No oxygen gas is added or removed from the product end, generally the top, of the adsorbent bed. This corresponds to step IIa of the process described by Baksh et al. In the illustrative embodiment, the pressure rises from 17 psia to 22 psia during this second step of seven seconds, said pressure reached is at or close to the desired upper adsorption pressure.

In step 3, constant pressure product make/feed adsorption, wherein feed gas, e.g. air, is introduced to the feed end, typically the bottom, of the adsorbent bed, while product gas, e.g. oxygen, is removed from the product end of the adsorbent bed. The pressure remains relatively constant at said 22 psia during this ten second step in the illustrative example. The oxygen product is passed to an oxygen surge tank, as well as to the other bed in the two-bed system, or another bed in the system if the system has more than two beds, for use as purge gas therein. The purity of the oxygen product remains relatively constant during the product make step, due to the oxygen repressurization gas added as provided in step 8 below, which introduces high purity oxygen to the product end of the adsorbent bed prior to the oxygen make step. This serves to eliminate any oxygen purity spike at the beginning of the step. This step is terminated prior to the nitrogen adsorption front actually breaking through at the product end of the adsorbent bed. This step is similar to step IIb of the Baksh et al process, with the added feature of the use of a portion of the product gas to provide purge gas for another bed.

In step 4, pressure equalization-falling, the adsorbent bed is cocurrently depressurized from the product end thereof, with the gas removed being transferred, directly or indirectly (i.e. through a separate equalization tank) to another bed in the adsorption system that is being pressurized and evacuated simultaneously, as in step 9 below. No gas is passed from the feed end of the adsorbent bed during this step. The adsorbent bed pressure is lowered from 22 psia to 18 psia during the two second duration of this step. The concentration of the oxygen removed from the adsorbent bed starts at the desired product purity, i.e. 90%, and falls to a lower purity, e.g. 80–90% oxygen, at the end of the step as the adsorption front of selectively adsorbed nitrogen breaks through at the product end of the adsorbent bed. The feed air compressor is vented during this step, which corresponds to step III of the Baksh et al process.

In step 5, falling pressure evacuation and overlap pressure equalization falling, waste nitrogen, the more selectively adsorbed component, is desorbed and removed from the feed end of the adsorbent bed, i.e. by countercurrent depressurization, using a vacuum pump, while the adsorption vessel and the adsorbent bed therein are simultaneously depressurized from the product end thereof by the pressure equalization falling, cocurrent depressurization thereof, with passage of the gas withdrawn from the product end thereof passing to the product end of the other bed in the two-bed system undergoing repressurization from a lower pressure. The pressure in the adsorbent bed thus falls from 16 psia to 13 psia during a step period of two seconds. The oxygen concentration at the product end of the adsorbent bed starts at said 80–90% purity and continues to fall to about 70%. This is a novel step not included in the process of Baksh et al.

In steps 6 and 7, falling pressure evacuation, the adsorbent bed is countercurrently depressurized by evacuation of gas from the feed end of the adsorbent bed, while the other bed of a two-bed system is undergoing simultaneous feed and product pressurization. In these steps, which correspond to step IV of the Baksh et al process, the pressure falls from 13 psia to a lower, subatmospheric (vacuum) desorption pressure of 4 psia over the course of a seventeen second period. No gas flows in or out of the product end of the bed during said steps 6 and 7. The waste gas purity falls rapidly during the duration of said steps to a minimum oxygen concentration of 5–10% in said waste.

In step 8, oxygen purge, the vacuum pump continues to remove waste gas from the feed end of the adsorbent bed, while oxygen purge gas is added to the product end of the adsorbent bed. The pressure is held constant during this three second step, i.e. at the lower, subatmospheric desorption pressure level of 4 psia by the oxygen purge gas flow, which is controlled so as to be the same as the waste evacuation flow. The oxygen concentration of the waste stream is nearly constant or slightly rising above the minimum level of 5–10%. This is a novel step not include in the process of Baksh et al.

In step 9, rising pressure evacuation and overlap pressure equalization, the vacuum pump continues to remove waste gas from the feed end of the adsorbent bed, while pressure equalization oxygen gas is introduced to the product end of the adsorbent bed. Operation of the feed blower is interrupted during this step, with said feed blower being vented during this period of time. The adsorbent bed pressure rises during this step as a result of the oxygen equalization flow, which is larger than the evacuation flow. The bed pressure rises from 4 psia to 6 psia during this two second step. The oxygen concentration of the waste stream begins to elevate slightly at the end of this step, which corresponds to step VI of the Baksh et al process, as an oxygen front displaced from the product end of the adsorbent bed in the direction of the feed end of the bed begins to break through at the feed end of the adsorbent bed. The feed blower is vented during this step.

In step 10, using pressure feed with overlap pressure equalization, the loading of the feed blower is resumed, and this step starts the feed air pressurization-adsorption period of the overall processing cycle. Feed air is passed into the feed end of the adsorbent bed by the feed compressor. The adsorbent bed is simultaneously pressurized from the product end of the adsorbent bed by the passage thereto of pressure equalization delivered from another bed, i.e., second bed B of the illustrated two-bed system, undergoing depressurization. The pressure of the adsorbent bed rises rapidly, during this two second step, from 9 psia to 13 psia.

The Table below shows not only the actual step times for each of the steps described above and employed in desirable embodiments of the invention, but also the average beginning and end pressures for each processing step, summarizing the information provided above.

TABLE

Cycle Description
Product Pressurization with
Purge and Overlap Equalization

| Step Description | Step Time | Start Pressure | End Pressure |
|---|---|---|---|
| Step #1 Raising pressure feed with overlap product pressurization | 3 | 13 | 17 |
| Step #2 Raising pressure feed | 7 | 17 | 22 |
| Step #3 Constant pressure feed with product make | 10 | 22 | 22 |
| Step #4 Falling pressure equalization | 2 | 22 | 18 |
| Step #5 Falling pressure evacuation with overlap equalization | 2 | 16 | 13 |
| Steps #6 & 7 Falling pressure evacuation | 17 | 13 | 4 |
| Step #8 Constant pressure evacuation with Oxygen purge | 3 | 4 | 4 |
| Step #9 Raising pressure evacuation with overlap equalization | 2 | 4 | 6 |
| Step #10 Raising pressure feed with overlap equalization | 2 | 9 | 13 |

The improved process of the invention incorporates, as necessary features, steps 5 and 10 related to overlap equalization, and steps 3 and 8 related to oxygen purge, in the Baksh et al process. From the description above, it will be seen that, in preferred embodiments of the invention, the processing cycle of the invention specifically includes steps 2 and 7, directed to rising pressure adsorption steps only, and steps 3 and 8 directed to constant pressure product make/ adsorption steps.

It will be understood that various changes and modifications can be made with respect to the processing cycle of the invention described herein without departing from the scope of the invention as set forth in the appended claims. Thus, while the invention is particularly desirable with respect to the separation and recovery of oxygen from feed air, it can also be employed for other gas separation applications, such as those referred to above. It will also be understood by those skilled in the art that the process conditions disclosed with respect to particular embodiments of the invention, e.g. operating pressure conditions, are provided for illustrative purposes only, and are not intended to limit or restrict the scope of the invention as set forth in the appended claims. Likewise, the process of the invention can be carried out in adsorbent beds containing any desired, commercially available adsorbent material, such as 13X zeolitic molecular sieves or advanced adsorbents, such as lithium-exchanged zeolites (LiX) or mixed cation adsorbents, capable of selectively adsorbing a more readily adsorbable component of a feed gas, e.g. nitrogen from feed air, with the recovery of the less readily adsorbable component from the adsorbent bed, e.g. oxygen from feed air.

It should also be noted that the constant pressure product make/adsorption, i.e. step 3 as described above, can be omitted from the processing cycle of the invention, although it is employed in preferred embodiments for the reasons indicated above. In the event that a separate step 3 is not employed, product gas is recovered from the bed as in steps (IIa) and (IIb) of the Baksh et al process. The omission of said step 3 would result in a lower production from the VPSA system, with a corresponding reduction in unit power consumption.

It should also be noted that the processing cycle of the invention can be operated at a higher desorption pressure than indicated above. Such embodiments would reduce the productive capacity of the system, with a corresponding reduction in unit power consumption.

The invention represents a desirable further advance in the VPSA art. In achieving the objects of the invention as set forth above, it enables VPSA processing to be advantageously employed at increased productive capacity. The process of the invention is particularly desirable in the production of VPSA-oxygen in the commercially significant production range of 30–125 TPD, thus enabling VPSA systems to more effectively satisfy the growing desire and need for VPSA processing in practical commercial operations.

We claim:

1. In a vacuum pressure swing adsorption process for the separation of a less readily adsorbable component of a feed gas mixture containing said component and a more readily adsorbable component in an adsorption system having two or more adsorbent beds containing adsorbent material capable of selectively adsorbing the more readily adsorbable component of said feed gas mixture, said process being carried out in each adsorbent bed, on a cyclic basis, and comprising the following steps:

(a) introducing a feed gas mixture to a feed end of the adsorbent bed while product gas is simultaneously added to a product end of the bed, the bed being pressurized thereby from a lower intermediate rising pressure to an intermediate pressure;

(b) passing the feed gas mixture to the feed end of the bed to increase the pressure of the bed from the intermediate pressure to an upper adsorption pressure, with recovery of less readily adsorbable component from the product end of the bed during or at the end of said increase in pressure of the bed;

(c) cocurrently depressurizing the bed from the upper adsorption pressure to an intermediate falling pressure, with passage of gas from the product end of the bed for use as pressure equalization gas in another bed in the system;

(d) countercurrently depressurizing the bed, with the evacuation of said more readily adsorbable component from the feed end thereof, thereby reducing the pressure of the bed from the intermediate falling pressure to a lower, subatmospheric desorption pressure; and (e) discharging additional quantities of gas from the feed end of the bed, while simultaneously introducing said less readily adsorbable component to the product end of the bed, the pressure of the bed increasing from said lower, subatmospheric desorption pressure to the intermediate rising pressure, the improvement comprising:

(1) following step (c) and prior to step (d), countercurrently depressurizing the bed, with discharge of gas from the feed end thereof, while simultaneously cocurrently depressurizing the bed with passage of gas from the product end thereof for use as pressurization gas in a bed in the system undergoing repressurization, the bed pressure decreasing from the intermediate falling pressure to a lower intermediate falling pressure; and (2) following step (d) and prior to step (e), discharging said more readily adsorbable component from the feed end of the bed, while simultaneously introducing said less readily adsorbable component as purge gas to the product end of the bed, the pressure of the bed remaining essentially at said lower, subatmospheric desorption pressure, whereby the productive capacity of the adsorption system is increased and the efficiency of the overall process is enhanced.

2. The process of claim 1 in which the feed gas mixture is air, the less readily adsorbable component is oxygen, and the more readily adsorbable component is nitrogen.

3. The process of claim 1 and including, in step (b), introducing the feed gas mixture to the feed end of the adsorbent bed at the upper adsorption pressure, while said less readily adsorbable component is withdrawn from the product end of the adsorbent bed.

4. The process of claim 3 and including passing a portion of the less readily adsorbable component withdrawn from the product end of the adsorbent bed of said upper adsorption pressure directly to the product end of another bed in the adsorption system as purge gas therefor.

5. The process of claim 4 in which the feed gas mixture is air, the less readily adsorbable component is oxygen, and the more readily adsorbable component is nitrogen.

6. The process of claim 5 in which the adsorption system comprises two adsorbent beds, the upper adsorption pressure being about 22 psia, and the lower desorption pressure is about 4 psia.

7. The process of claim 6 in which said upper intermediate rising pressure is about 17 psia, said intermediate pressure is about 13 psia, and said lower intermediate rising pressure is about 6 psia.

8. The process of claim 7 in which the upper intermediate falling pressure is about 18 psia, and the lower intermediate falling pressure is about 13 psia.

9. The process of claim 4 in which the adsorption system comprises two adsorbent beds.

10. The process of claim 1 in which the adsorption system comprises two adsorbent beds.

11. The process of claim 1 in which said adsorbent material comprises a zeolitic molecular sieve.

12. The process of claim 11 in which said zeolitic molecular sieve is capable of selectively adsorbing nitrogen from feed air as said more selectively adsorbable component thereof, with the feed gas mixture being air.

* * * * *